United States Patent [19]
Teich et al.

[11] 3,867,497
[45] Feb. 18, 1975

[54] PROCESS OF MAKING HOLLOW BODIES OR TUBES OF SEMI-CONDUCTING MATERIALS

[75] Inventors: Horst Teich; Alois Göppinger, both of Burghausen, Germany

[73] Assignee: Wacker-Chemitronic GmbH, Burghausen, Germany

[22] Filed: Mar. 28, 1973

[21] Appl. No.: 345,805

[30] Foreign Application Priority Data
Mar. 28, 1972   Germany............................ 2215143

[52] U.S. Cl.................. 264/81, 117/106 A, 264/65, 264/66
[51] Int. Cl....................... B01j 17/28, B29c 13/04
[58] Field of Search..... 264/81; 117/106 A; 264/65, 264/66

[56] References Cited
UNITED STATES PATENTS

| | | | |
|---|---|---|---|
| 3,476,640 | 11/1969 | Sirtl et al. | 264/81 |
| 3,576,932 | 4/1971 | Biddulph | 264/81 |
| 3,679,470 | 7/1972 | Rogers | 117/106 A |
| 3,686,378 | 8/1972 | Dietze | 264/81 |
| 3,698,936 | 10/1972 | Moltzan | 264/81 |
| 3,730,766 | 5/1973 | Nishimatsu et al. | 117/106 A |
| 3,734,770 | 5/1973 | Price et al. | 117/106 A |

Primary Examiner—Donald J. Arnold
Attorney, Agent, or Firm—Allison C. Collard

[57] ABSTRACT

Process for making semi-conducting hollow bodies by thermal splitting of volatile semi-conducting silicon compounds comprising passing the volatile silicon compounds over a carbon mold or a carbon-coated mold, and depositing thereon in three successive stages, $SiO_2$, amorphous silicon, and polycrystalline silicon by adjustment of the temperature in each stage, and, after cooling, lifting the polycrystalline silicon body off the mold. The invention also comprises the polycrystalline Si body so made.

5 Claims, 6 Drawing Figures

PROCESS OF MAKING HOLLOW BODIES OR TUBES OF SEMI-CONDUCTING MATERIALS

The present invention relates to a process for making semi-conducting hollow bodies, particularly tubes, by thermal splitting of volatile semi-conducting materials, especially silicon compounds, in the presence of an excess of hydrogen at temperatures up to 1,250° C.

The production of hollow bodies of silicon, or of silicon tubes, is difficult, because the body formed on the mold usually breaks up when it is separated from the mold. This difficulty can be overcome by using, as a mold or carrier, a body made of a material having a higher thermal expansion co-efficient than that of the semi-conducting material. But even then, cracks will form in the semi-conducting material when it is separated from the carrier. This problem cannot be eliminated by after-treatment.

According to another known method, semiconductor hollow bodies, closed at one end, are made by covering the tube at the open end by a disk of the same material to make it gas-tight, and by further precipitation of material as a result of thermal splitting of gaseous compounds.

A process has now been found for making semiconducting hollow bodies, more particularly from silicon compounds by thermal splitting of volatile silicon compounds in the presence of an excess of hydrogen at temperatures up to 1,250°C. The process comprises the use of a mold consisting of carbon, or coated with carbon, on which $SiO_2$ is first deposited, then amorphous silicon follows, as an intermediate layer, and finally polycrystalline silicon is deposited. The composite body is allowed to cool and the deposited polycrystalline Si body separated from the mold.

Silicon tubes made in this manner can be used as ampoules having diameters of about 65 mm and lengths of 600 mm. They are also used as diffusion tubes having diameters up to 110 mm and lengths of about 1,300 mm and more. They are especially useful for carrying out diffusion processes. Such diffusions, or coating of semi-conductors, for example, with aluminum, gallium, phosphorus, as well as oxidations, are effected under their inherent vapor pressure, or in a vacuum at temperatures between 1,100° and 1,250° C. The hollow bodies of silicon made according to the invention are superior to the quartz tubes presently used in diffusion devices. The latter are deformed at temperatures above 1,200° C, especially in a vacuum, and they have a tendency toward crystallization. At the places of contact between quartz tubes and diffusion material, such as for example, silicon disks, sliding or displacement frequently takes place. On the other hand, polycrystalline silicon tubes are gas and vacuum tight, and are stable up to 1,300° C. They protect the diffusion material by screening, and will not lead to quality impairment at the points of contact. The known discharge of traces of impurities occurring in quartz tubes will be avoided.

It is a further important advantage that with the formation of a separating layer according to the invention, no silicon carbide will be deposited on the carbon mold so that the mold can be easily separated from the semiconducting body. That also permits the molds to be used repeatedly. The separated semi-conducting body can be purified by etching one or more times so that the compounds used as separating layers can be easily removed.

Gaseous silicon compounds for making the molded silicon bodies are silane, dichlorosilane, trichlorosilane or silicon tetrachloride.

The process according to the invention is not limited to the production of hollow bodies of silicon, but it is also useful for making, for example, hollow bodies consisting of germanium or other semi-conducting materials, whose volatile compounds can be split.

In the following, the process of the invention will be illustrated by a number of examples with reference to the accompanying drawings, in which.

Figure 1:
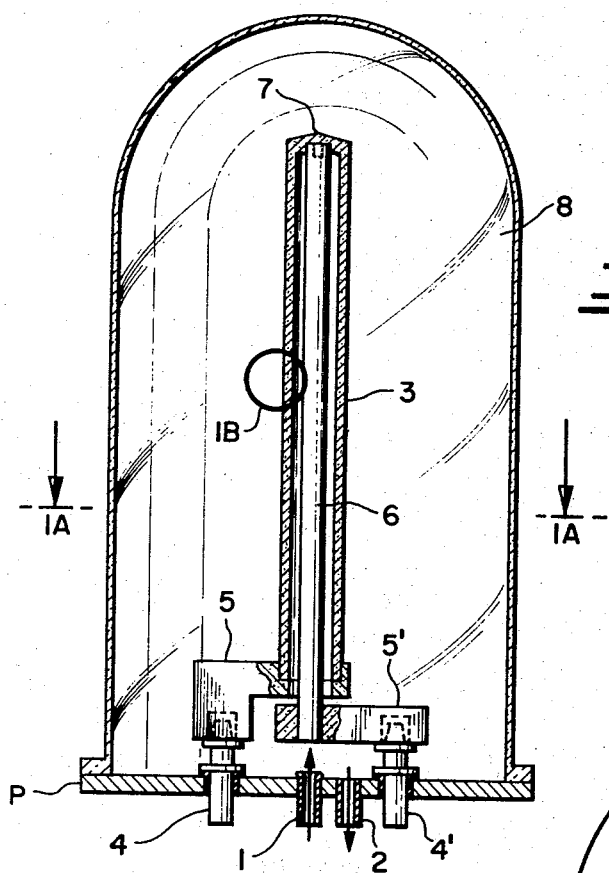
FIG. 1 shows a conventional device for making elongated hollow bodies, partly in elevation and partly in section.
Figure 1B:
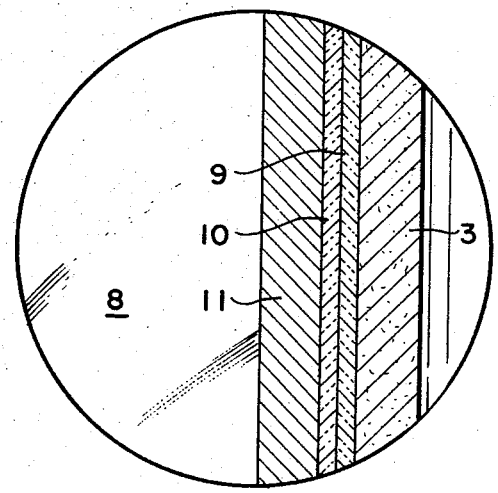
FIG. 1a illustrates the bottom plate.
Figure 1A:
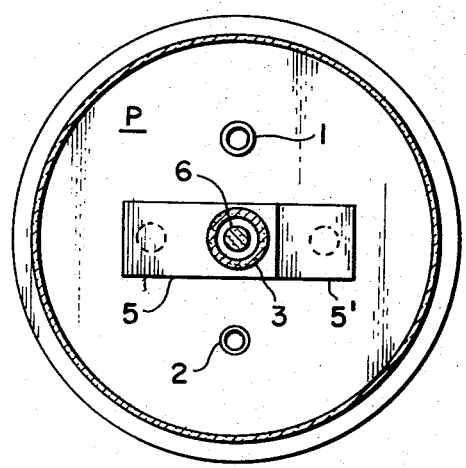
Figure 2:
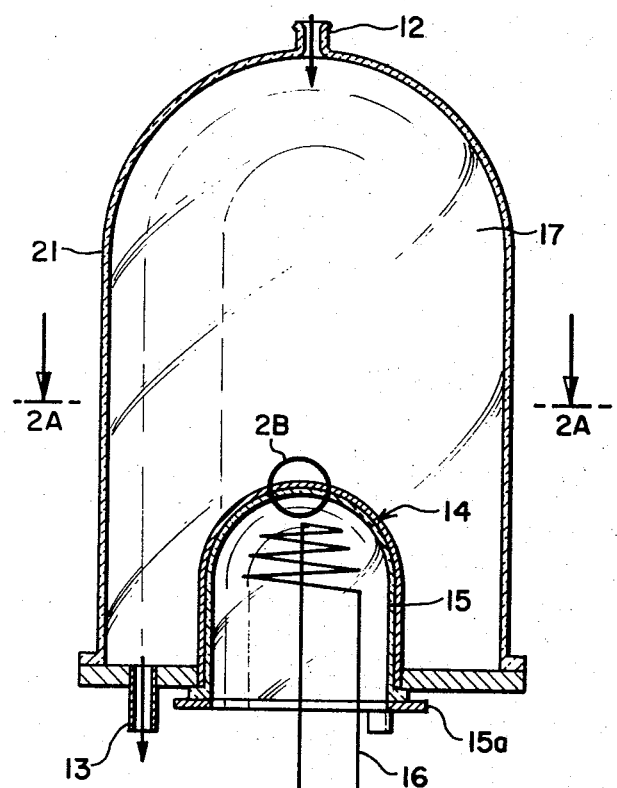
Figure 2B:
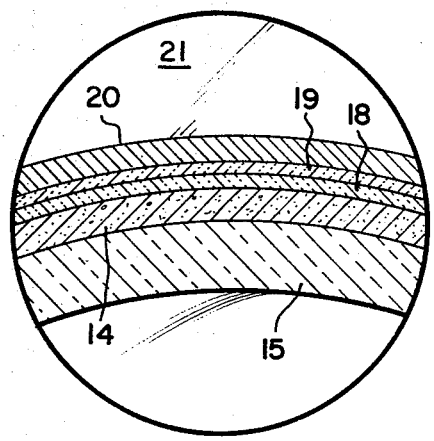
Figure 2A:
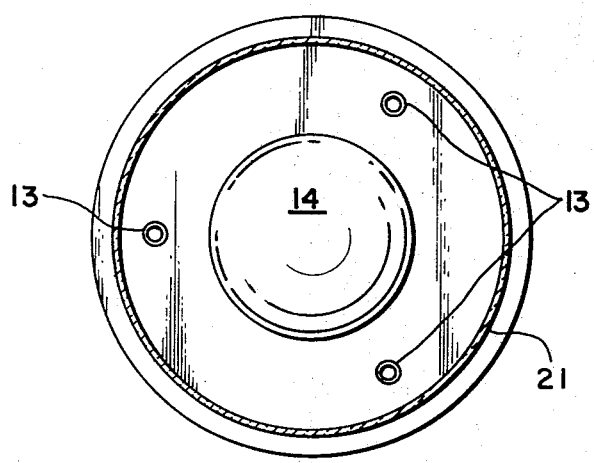

FIG. 1b 1b shows, on an enlarged scale a detail marked 1b in FIG. 1;

FIG. 2 shows a device for making dome-shaped silicon bodies;

FIG. 2a illustrates the bottom plate, and

FIG. 2b shows, on an enlarged scale, a detail marked 2b in FIG. 2.

EXAMPLE 1

Referring now to FIG. 1, an apparatus is illustrated for making elongated silicon tubes closed at one end. A nozzle 1 is provided to admit the reaction gas while a pipe 2 serves to exit the waste gas. Both passages lead through a bottom plate P. A mold 3 is heated by direct current. The current passes into electrodes 4, transmission members 5, and a carbon rod 6 to the carbon mold 3. The latter and a cap 7 close the circuit and permit adjustment of the desired temperatures for depositing the silicon dioxide.

The apparatus comprises a reaction chamber 8 in which the mold 3 is disposed. Shortly before the reaction chamber is closed, an $SiO_2$ layer is deposited on the mold at room temperature; for that purpose, a mixture of trichlorosilane and hydrogen is burnt in air. The $SiO_2$ layer is shown at 9. On this layer, amorphous silicon 10 is deposited from the reaction gas consisting of 5 – 12% $SiHCl_3$ in $H_2$ at 600° – 800° C.

In order to keep the separating layer of $SiO_2$ and amorphous silicon undisturbed, the temperature is evenly raised for 60 minutes to 950° C., and the layer reinforced by maintaining this temperature for another 60–90 minutes. Then, polycrystalline Si, designated at 11, is deposited at 1,050° – 1,250° C.

After the reaction chamber is cooled and opened, the prepared Si-hollow tube can be easily separated from the mold. The remainder of the intermediate layer can be removed from the interior of the Si-tube by a known purification process by etching. As above mentioned, the mold can be used again for making a hollow body.

EXAMPLE 2

In the device shown in FIG. 2, a reaction chamber 17 is provided with gas inlet 12 at the dome of a bell-shaped quartz container 21. Waste gas is discharged at the bottom over three evenly distributed outlets 13, (FIG. 2a). A carbon body 14 fits over a quartz bell 15 which closes the reaction chamber at the bottom by flange 15a.

The carbon body is heated by a heating coil 16 or it is heated indirectly by high frequency current. The $SiO_2$ layer 18, the intermediate layer 19 and the polycrystalline silicon body 20 are deposited in the manner described in Example 1.

While only two examples of the present invention have been shown and described, it will be obvious that many changes and modifications can be made without departing from the spirit and scope of the invention.

What is claimed is:

1. A process for making semi-conducting hollow bodies by thermal splitting of volatile semi-conducting silicon compounds, comprising passing the volatile silicon compounds over a carbon mold and depositing thereon in three successive stages, first $SiO_2$ by burning trichlorosilane and hydrogen in air, then depositing amorphous silicon by passing a reaction gas consisting of 5–12% of $SiHCl_3$ in hydrogen over the deposited $SiO_2$ at a temperature of 600°–800° C, thereby forming an intermediate layer, next depositing polycrystalline silicon by adjustment of the temperature to 1,050°–1,250° C. and finally, after cooling lifting the polycrystalline silicon body off the mold.

2. The process as defined in claim 1, wherein the temperature during the second step is evenly raised from 800° to 950° C during 60 minutes and then maintained for 60–90 minutes at 950° C in order to reinforce the intermediate layer.

3. The process as defined in claim 1, wherein the mold is a carbon-coated body.

4. The process as defined in claim 1, wherein the body of polycrystalline silicon is purified by etching.

5. The process as defined in claim 1, wherein the volatile silicon compound is a member selected from the group consisting of monosilane, dichlorosilane, trichlorosilane and silicon tetrachloride.

* * * * *